United States Patent
Lowes et al.

(10) Patent No.: US 12,327,123 B2
(45) Date of Patent: Jun. 10, 2025

(54) COUNT TO EMPTY FOR MICROARCHITECTURAL RETURN PREDICTOR SECURITY

(71) Applicant: Intel Corporation, Santa Clara, CA (US)

(72) Inventors: Mathew Lowes, Austin, TX (US); Martin Licht, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/352,671

(22) Filed: Jun. 21, 2021

(65) Prior Publication Data

US 2022/0405102 A1  Dec. 22, 2022

(51) Int. Cl.
G06F 9/38 (2018.01)
G06F 9/30 (2018.01)
G06F 9/32 (2018.01)

(52) U.S. Cl.
CPC ........ *G06F 9/3848* (2013.01); *G06F 9/30145* (2013.01); *G06F 9/321* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 6,560,696 B1 * | 5/2003 | Hummel | G06F 9/30054 712/237 |
| 9,361,112 B2 * | 6/2016 | Demongeot | G06F 9/3806 |
| 2002/0194463 A1 * | 12/2002 | Henry | G06F 9/323 712/E9.057 |
| 2003/0120906 A1 * | 6/2003 | Jourdan | G06F 9/323 712/228 |
| 2004/0143727 A1 * | 7/2004 | McDonald | G06F 9/323 712/228 |
| 2007/0061555 A1 * | 3/2007 | St. Clair | G06F 9/30054 712/E9.083 |
| 2008/0301420 A1 * | 12/2008 | Inoue | G06F 9/3806 712/240 |
| 2013/0275726 A1 * | 10/2013 | Ukai | G06F 9/323 712/221 |

(Continued)

FOREIGN PATENT DOCUMENTS

EP  1662377  5/2006

OTHER PUBLICATIONS

Wang, G. et al., Self-Aligning Return Address Stack, 2012, IEEE, pp. 278-282. (Year: 2012).*

(Continued)

*Primary Examiner* — Eric Coleman
(74) *Attorney, Agent, or Firm* — Essential Patents Group, LLP

(57) ABSTRACT

An embodiment of an integrated circuit may comprise a return stack buffer (RSB), a speculative return stack buffer (SRSB), and circuitry coupled to the RSB and the SRSB, the circuitry to track a count until the SRSB is empty at a time of a prediction by a branch prediction unit, and return an output from the branch prediction unit that corresponds to one of the RSB and the SRSB based at least in part on the count until the SRSB is empty. Other embodiments are disclosed and claimed.

18 Claims, 18 Drawing Sheets

(56) References Cited

U.S. PATENT DOCUMENTS

2014/0337604 A1* 11/2014 Strong ................ G06F 9/30145
712/205
2018/0095753 A1* 4/2018 Bai ....................... G06F 9/3814

OTHER PUBLICATIONS

Extended European Search Report from European Patent Application No. 22159093.8 notified Aug. 29, 2022, 10 pgs.
Office Action from European Patent Application No. 22159093.8 notified Mar. 10, 2025, 8 pgs.

* cited by examiner

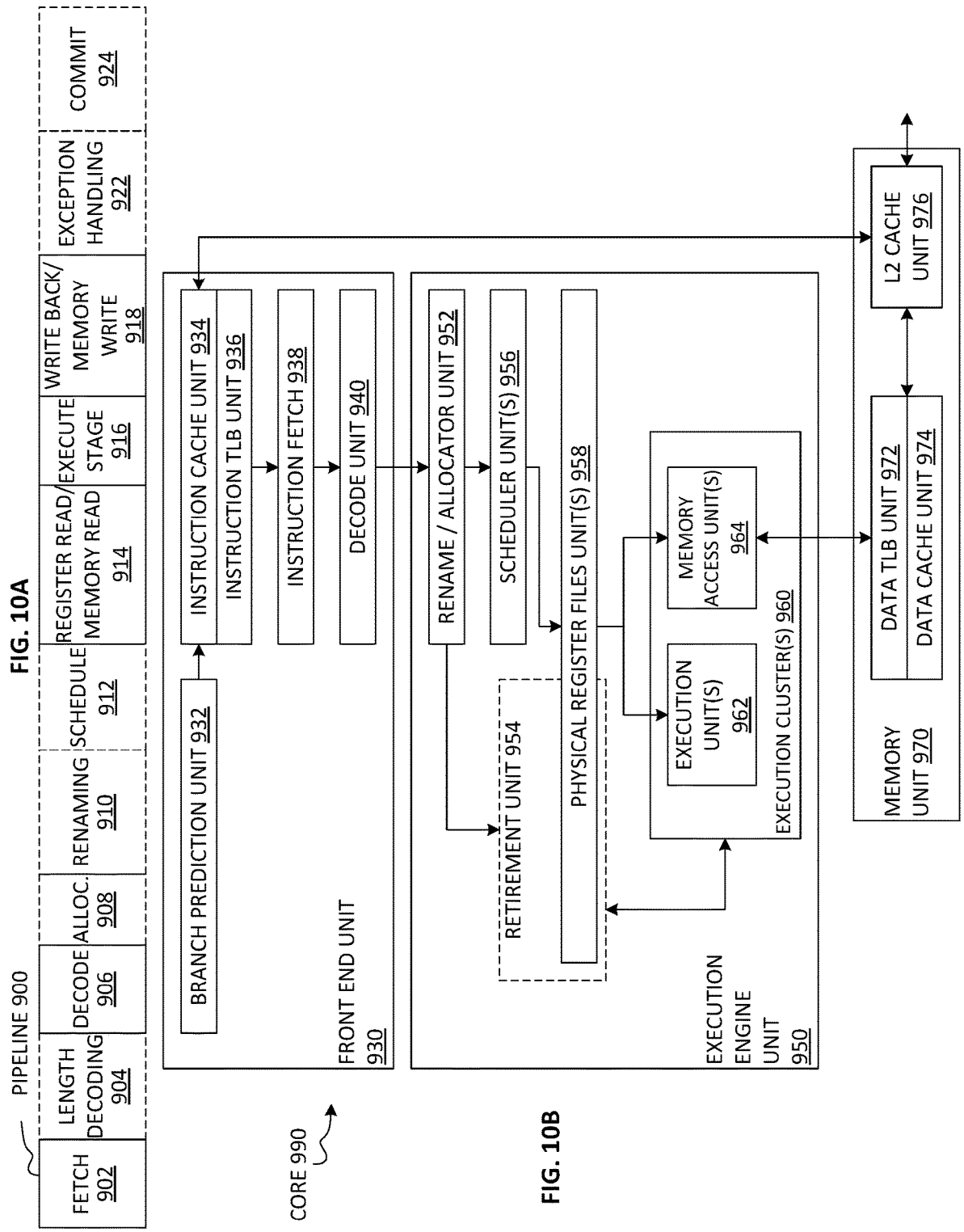

COUNT TO EMPTY FOR MICROARCHITECTURAL RETURN PREDICTOR SECURITY

BACKGROUND

1. Technical Field

This disclosure generally relates to processor technology, instruction decode technology, and speculative decode technology.

2. Background Art

Some central processor unit (CPU) cores may utilize speculative execution to avoid pipeline stalls and achieve better performance, which allows execution to continue without having to wait for the architectural resolution of a branch target. Branch prediction technology utilizes a digital circuit that guesses which way a branch will go before the branch instruction is executed. Correct predictions/guesses improve the flow in the instruction pipeline. In general, a branch prediction for a conditional branch may be understood as a prediction for the branch as "taken" vs. "not-taken." A branch prediction unit (BPU) may support speculative execution by providing branch prediction for a frond-end of a CPU based on the branch instruction pointer (IP), branch type, and the control flow history (also referred as branch history) prior to the prediction point.

BRIEF DESCRIPTION OF THE DRAWINGS

The various embodiments of the present invention are illustrated by way of example, and not by way of limitation, in the figures of the accompanying drawings and in which:

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
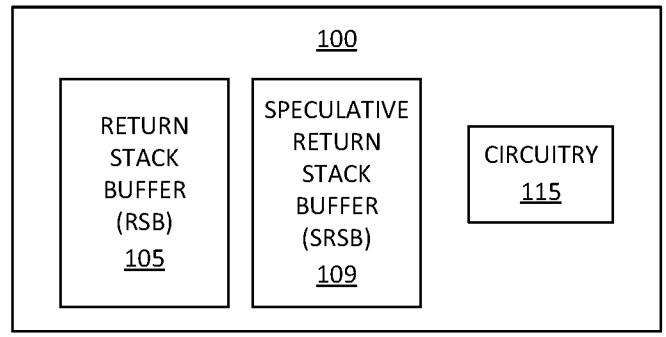
FIG. 1 is a block diagram of an example of an integrated circuit according to an embodiment.

Embodiments discussed herein variously provide techniques and mechanisms for count to empty technology for microarchitectural return predictor security. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to decode instructions.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology to count to empty for improved performance of microarchitectural return predictor security. The microarchitectural return predictor used in some processors has specific vulnerabilities that allow a return prediction to be reused at fetch time, requiring the predictor to be cleared on mode and process transitions. Control-flow enforcement technology (CET) may address some vulnerabilities architecturally at the execution level, but not at the microarchitectural level during fetch and decode for speculatively filling structures such as translation look-aside buffers (TLBs), instruction caches, etc. To determine which part of the return predictor to use, some technology may involve a tag that records the current stack size, and a color bit that is compared to read and write pointers to detect wraps.

When either of these mechanisms detects an overflow case, the outputs of a committed return stack buffer (RSB) are selected over the speculative return stack buffer (SRSB). For example, the RSB may be selected over the SRSB in this example because the RSB is updated in the pipeline. The RSB may not necessarily have more recent information than the SRSB contains if the RSB is not overflowed, but the RSB is generally able to make many more predictions without overflowing. To determine when the SRSB is overflowed, some technology uses the color bits to detect wraps of the SRSB, and a stack size comparison, but the return predictors are flushed during mode transitions as a security precaution. Unnecessary flush of the return predictors creates a performance penalty due to the loss of potentially useful predictions. If the overflow is not correctly detected, the system may be vulnerable to a side-channel attack. Advantageously, some embodiments may overcome one or more of the foregoing problems.

Some embodiments may improve security by stopping leaks of a cross-domain address from the return predictor and/or may improve performance by reducing the need to flush the return predictor on mode transitions. Some embodiments may resolve a speculative return target reuse condition, which enables greater security, and better performance by not needing to clear the return array in all situations.

With reference to FIG. 1, an embodiment of an integrated circuit 100 may include a return stack buffer (RSB) 105, a speculative return stack buffer (SRSB) 109, and circuitry 115 coupled to the RSB 105 and the SRSB 109. The circuitry 115 may be configured to track a count until the SRSB 109 is empty at a time of a prediction by a branch prediction unit, and return an output from the branch prediction unit that corresponds to one of the RSB 105 and the SRSB 109 based at least in part on the count until the SRSB 109 is empty. For example, the circuitry 115 may be further configured to return the output from the branch prediction unit that corresponds to the RSB 105 if the count until the SRSB 109 is empty is zero.

In some embodiments, the circuitry 115 may be configured to increment the count until the SRSB 109 is empty by a difference between a first pointer value and a second pointer value, in response to an insertion into the SRSB 109, wherein the first pointer value corresponds to a top position of a stack for the SRSB 109 and wherein the second pointer value corresponds to an allocated position for a next entry into the SRSB 109. For example, the circuitry 115 may also be configured to limit the incremented count to an upper limit value of a maximum number of entries in the SRSB 109. In some embodiments, the circuitry 115 may be configured to decrement the count until the SRSB 109 is empty by a difference between a first pointer value and a second pointer value, in response to a consumption of a prediction from the SRSB 109, wherein the first pointer value corresponds to a current top position of a stack for the SRSB 109 and the second pointer value corresponds to a new top position of the stack for the SRSB 109 after the consumption of the prediction from the SRSB 109. For example, the circuitry 115 may also be configured to limit the decremented count to a lower limit value of zero.

In some embodiments, the circuitry 115 may be further configured to store a max pointer value to track a furthest point written in the SRSB 109. The circuitry 115 may also be configured to update the count until the SRSB 109 is empty based on the max pointer value, in response to a misprediction recovery. For example, the circuitry 115 may be configured to determine a number of overwritten entries in the SRSB 109 based at least in part on the max pointer value, and update the count until the SRSB 109 is empty based on the number of overwritten entries, in response to the misprediction recovery.

Figure 16:
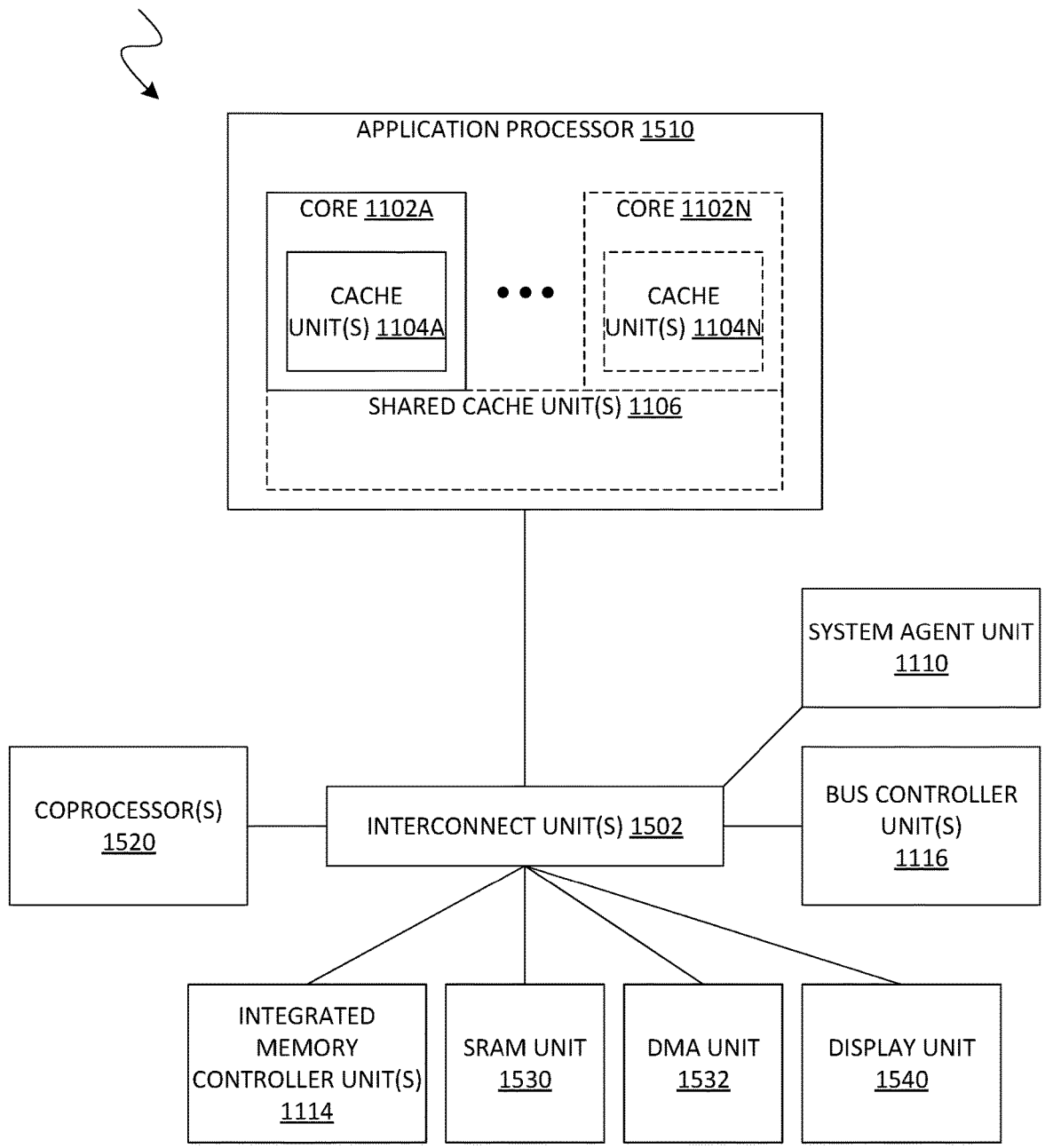
Figure 17:
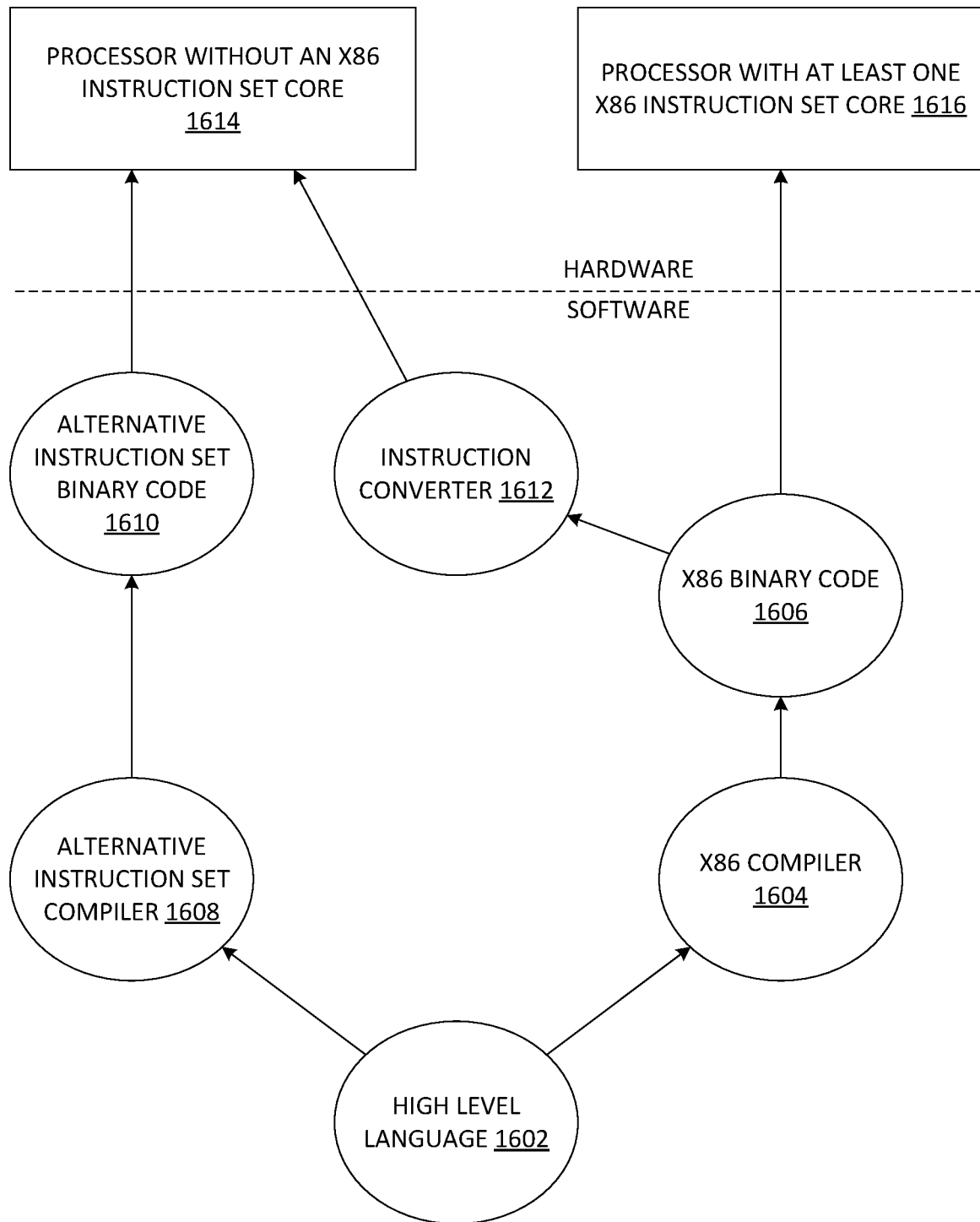
FIG. 17 is a block diagram contrasting the use of a software instruction converter to convert binary instructions in a source instruction set to binary instructions in a target instruction set according to embodiments of the invention.

Embodiments of the integrated circuit 100, including the RSB 105, the SRSB 109, and/or the circuitry 115, may be incorporated in a processor including, for example, the core 990 (FIG. 10B), the cores 1102A-N (FIGS. 12, 16), the processor 1210 (FIG. 13), the co-processor 1245 (FIG. 13), the processor 1370 (FIGS. 14-15), the processor/coprocessor 1380 (FIGS. 14-15), the coprocessor 1338 (FIGS. 14-15), the coprocessor 1520 (FIG. 16), and/or the processors 1614, 1616 (FIG. 17). In particular, embodiments of the RSB 105, the SRSB 109, and/or the circuitry 115 may be incorporated in the branch prediction unit 932 (FIG. 10B).

Figure 2A:
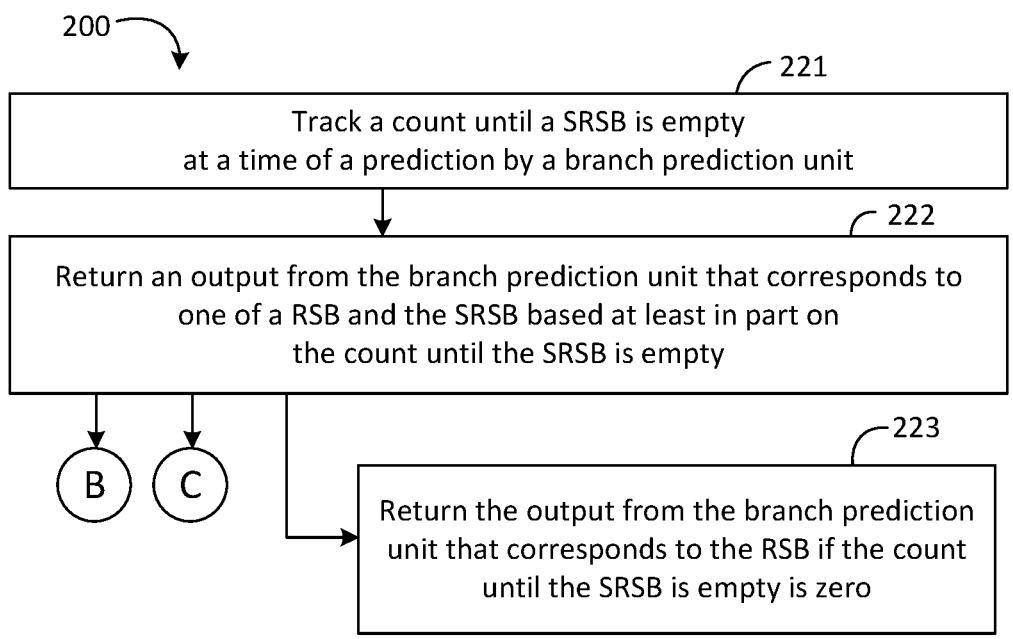
FIGS. 2A to 2C are flow diagrams of an example of a method according to an embodiment.
Figure 2B:
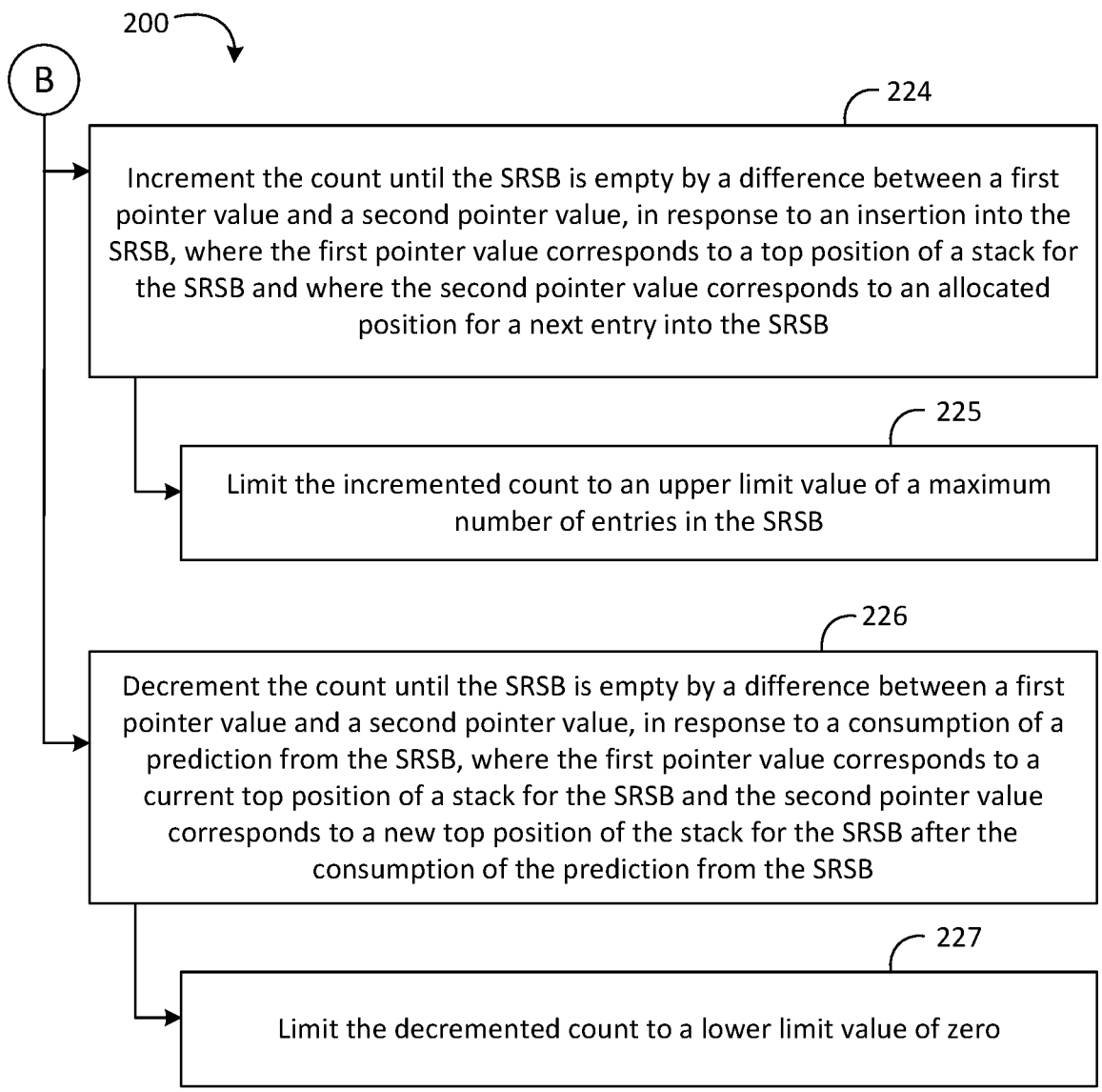
Figure 2C:
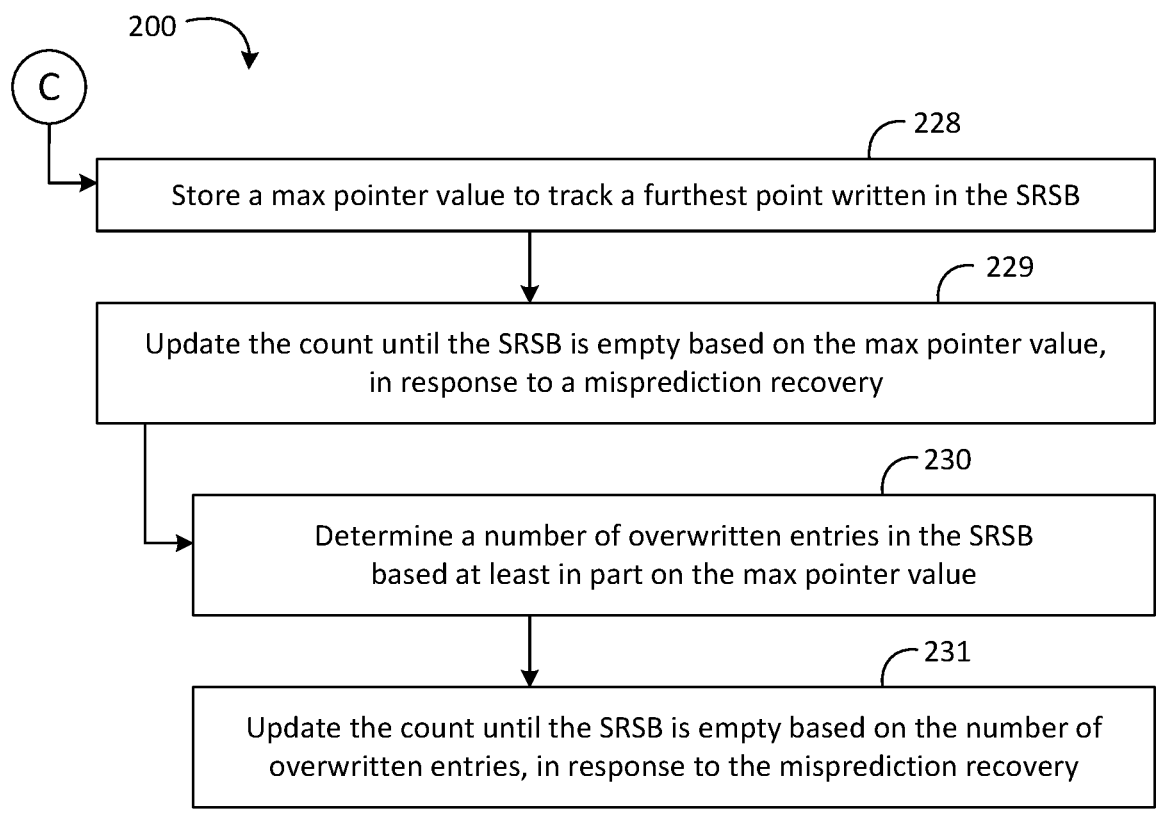

With reference to FIGS. 2A to 2C, an embodiment of a method 200 may include tracking a count until a SRSB is empty at a time of a prediction by a branch prediction unit at box 221, and returning an output from the branch prediction unit that corresponds to one of a RSB and the SRSB based at least in part on the count until the SRSB is empty at box 222. For example, the method 200 may include returning the output from the branch prediction unit that corresponds to the RSB if the count until the SRSB is empty is zero at box 223.

Some embodiments of the method 200 may further include incrementing the count until the SRSB is empty by a difference between a first pointer value and a second pointer value at box 224, in response to an insertion into the SRSB, where the first pointer value corresponds to a top position of a stack for the SRSB and where the second pointer value corresponds to an allocated position for a next entry into the SRSB. For example, the method 200 may also include limiting the incremented count to an upper limit value of a maximum number of entries in the SRSB at box 225. Some embodiments of the method 200 may further include decrementing the count until the SRSB is empty by a difference between a first pointer value and a second pointer value at box 226, in response to a consumption of a prediction from the SRSB, where the first pointer value corresponds to a current top position of a stack for the SRSB and the second pointer value corresponds to a new top position of the stack for the SRSB after the consumption of the prediction from the SRSB. For example, the method 200 may also include limiting the decremented count to a lower limit value of zero at box 227.

Some embodiments of the method 200 may further include storing a max pointer value to track a furthest point written in the SRSB at box 228. The method 200 may also include updating the count until the SRSB is empty based on the max pointer value at box 229, in response to a misprediction recovery. For example, the method 200 may include determining a number of overwritten entries in the SRSB based at least in part on the max pointer value at box 230, and updating the count until the SRSB is empty based on the number of overwritten entries at box 231, in response to the misprediction recovery.

Figure 3:
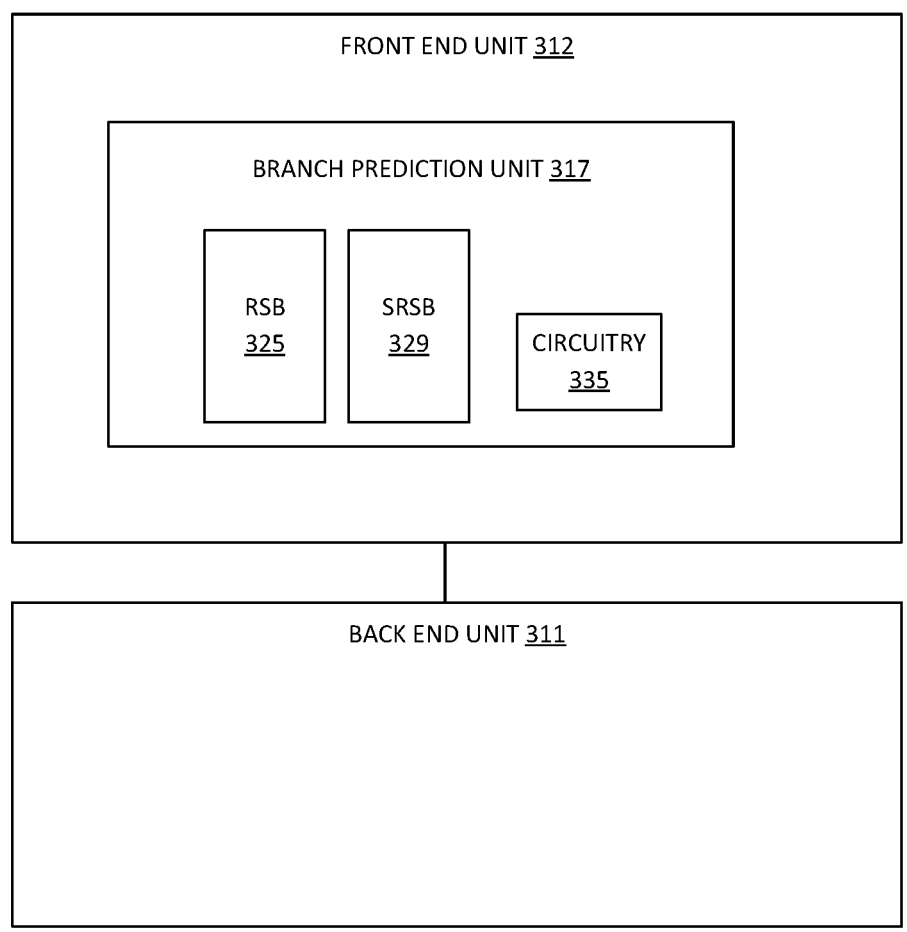
FIG. 3 is a block diagram of an example of an apparatus according to an embodiment.

With reference to FIG. 3, an embodiment of an apparatus 300 may include a back end unit 311 to execute one or more decoded instructions, and a front end unit 312 communicatively coupled to the back end unit 311 to decode one or more instructions. The front end unit 312 may include a branch prediction unit 317. The branch prediction unit 317 may include a RSB 325, a SRSB 329, and circuitry 335 coupled to the RSB 325 and the SRSB 329. The circuitry 335 may be configured to track a count until the SRSB 329 is empty at a time of a prediction by the branch prediction unit 317, and return an output from the branch prediction unit 317 that corresponds to one of the RSB 325 and the SRSB 329 based at least in part on the count until the SRSB 329 is empty. For example, the circuitry 335 may be further configured to return the output from the branch prediction unit that corresponds to the RSB 325 if the count until the SRSB 329 is empty is zero.

In some embodiments, the circuitry 335 may be configured to increment the count until the SRSB 329 is empty by a difference between a first pointer value and a second pointer value, in response to an insertion into the SRSB 329, wherein the first pointer value corresponds to a top position of a stack for the SRSB 329 and wherein the second pointer value corresponds to an allocated position for a next entry into the SRSB 329. For example, the circuitry 335 may also be configured to limit the incremented count to an upper limit value of a maximum number of entries in the SRSB 329. In some embodiments, the circuitry 335 may be configured to decrement the count until the SRSB 329 is empty by a difference between a first pointer value and a second pointer value, in response to a consumption of a prediction from the SRSB 329, wherein the first pointer value corresponds to a current top position of a stack for the SRSB 329 and the second pointer value corresponds to a new top position of the stack for the SRSB 329 after the consumption of the prediction from the SRSB 329. For example, the circuitry 335 may also be configured to limit the decremented count to a lower limit value of zero.

In some embodiments, the circuitry 335 may be further configured to store a max pointer value to track a furthest point written in the SRSB 329. The circuitry 335 may also be configured to update the count until the SRSB 329 is empty based on the max pointer value, in response to a misprediction recovery. For example, the circuitry 335 may be configured to determine a number of overwritten entries in the SRSB 329 based at least in part on the max pointer value, and update the count until the SRSB 329 is empty based on the number of overwritten entries, in response to the misprediction recovery.

Embodiments of the front end unit 312, the branch prediction unit 317, the RSB 325, the SRSB 329, and/or the circuitry 335, may be incorporated in a processor including, for example, the core 990 (FIG. 10B), the cores 1102A-N (FIGS. 12, 16), the processor 1210 (FIG. 13), the coprocessor 1245 (FIG. 13), the processor 1370 (FIGS. 14-15), the processor/coprocessor 1380 (FIGS. 14-15), the coprocessor 1338 (FIGS. 14-15), the coprocessor 1520 (FIG. 16), and/or the processors 1614, 1616 (FIG. 17). In particular, embodiments of the branch prediction unit 317, the RSB 325, the SRSB 329, and/or the circuitry 335 may be incorporated in the front end unit 930 (FIG. 10B).

In some embodiments, count to empty overflow detection technology may utilize a saturating counter to track the number of entries in the SRSB until the SRSB is empty. A separate counter may track the furthest point written in the SRSB and the separate counter value may be compared with the count-to-empty value on a misprediction recovery to determine how many entries are still available. If the count-to-empty value is 0, then the committed RSB output is selected over the SRSB output. Advantageously, some embodiments may remove deterministic corner cases that could result in a return misprediction to a non-zero target, thereby eliminating a possible side channel attack vector and improving the correctness of return predictions. Some embodiments may also remove the need to flush the return predictor in some cases, further increasing branch prediction performance. Some embodiments may also save hardware area by requiring fewer bits to be stored, as compared to some conventional technology. Some embodiments may better determine whether the SRSB is able to make a valid prediction.

The SRSB is a return target predictor that is updated at prediction time (e.g., the return targets are "speculative"). Because the SRSB is updated a prediction time, the SRSB must be able to recover from mispredictions. This causes the SRSB to function similar to a linked-list (e.g., as opposed to a stack like other return predictors or return stack buffers). Each new call has its next instruction pointer allocated to a new SRSB entry, which is a pointer to the previous top-of-stack entry. A return prediction takes the target from the current top-of-stack pointer to the RSB, then moves the top-of-stack following the pointer from the entry read. Because of how the SRSB always allocates calls to the next entry but can follow the return pointers to any other entry, it is possible to overflow the array structure with any size of call stack greater than 1 call. This overflow happens when a return prediction is taking from an SRSB entry that has been overwritten by a younger call. By intentionally causing an overflow, an attacker may attempt to expose side-channel vulnerabilities. Some embodiments may remove this vulnerability and will not predict to the address stored in an invalid SRSB entry. Instead, some embodiment will predict to a default address given when the RSB has been overflowed.

An embodiment of a SRSB may include any useful number of entries, up to a maximum size. A value of a counter, referred to as "count_to_empty," may indicate how many of the entries of the SRSB are currently available (e.g., when the value of count_to_empty is zero, the SRSB has no valid entries). A pointer referred to as "stos" may indicate a current top of the stack position for the SRSB. Another pointer referred to as "salloc" may indicate a next SRSB allocation position. In some embodiments of count to empty technology, instead of storing information with each SRSB entry, the count_to_empty counter keeps a live prediction-time count of the number of SRSB entries available for return predictions. Notably, the count_to_empty counter keeps count of the valid entries available, not the number of predictions. When a call is inserted into the SRSB, the count_to_empty counter is incremented by the difference between the current stos pointer and the salloc pointer.

Figure 4:
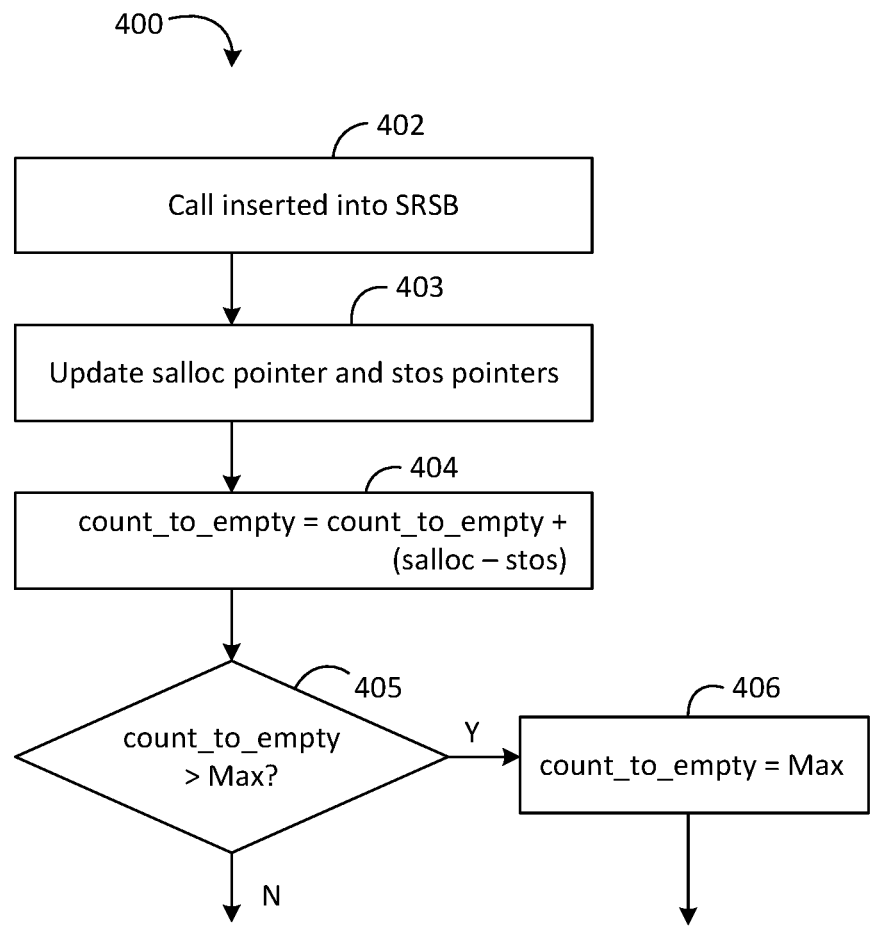
FIG. 4 is a flow diagram of another example of a method according to an embodiment.

With reference to FIG. 4, an embodiment of a method 400 may start with a call inserted into the SRSB at box 402. The salloc and stos pointers are updated at box 403. For example, on inserting a call, the salloc pointer is updated (incremented by 1), and the stos pointer is updated with no dependence on the count_to_empty counter value. The count_to_empty counter value is incremented by the difference between the salloc pointer and the current stos pointer at box 404. If the value of count_to_empty is greater than the maximum size of the SRSB at box 405, then the value of count_to_empty is set to the maximum size of the SRSB at box 406.

Figure 5A:
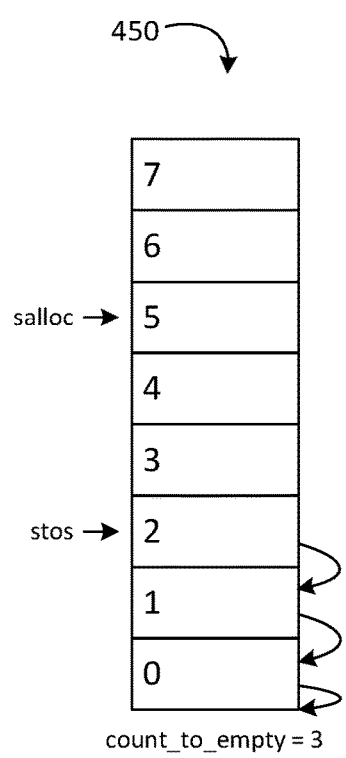
FIGS. 5A to 5C are illustrative diagrams of an example of a speculative return stack buffer according to an embodiment.
Figure 5B:
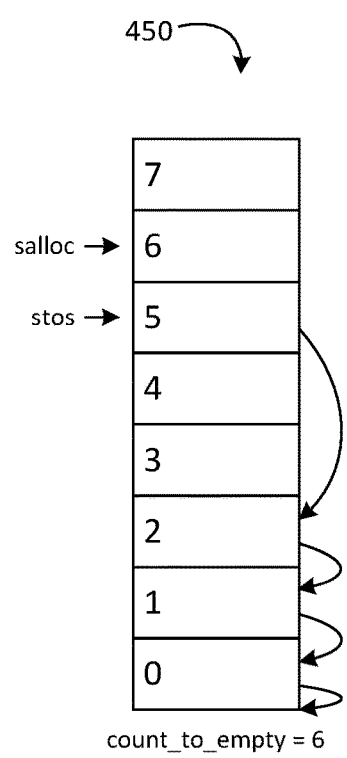
Figure 5C:
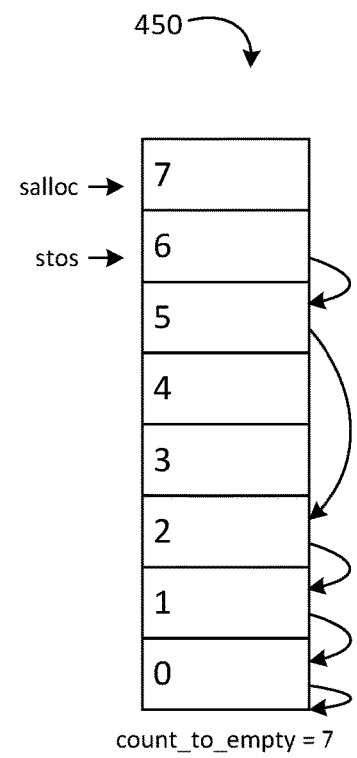

With reference to FIGS. 5A to 5C, an embodiment of a SRSB 450 may include a maximum of eight (8) entries labeled zero (0) through seven (7). The value of a count_to_empty counter indicates how many of the entries of the SRSB 450 are currently available. The stos pointer indicates a current top of the stack position for the SRSB 450. The salloc pointer indicates a next SRSB allocation position. In an initial state of the SRSB 450, as shown in FIG. 5A, count_to_empty=3, stos points to the third entry position (entry 2), and salloc points to the sixth entry position (entry 5). After a call is inserted in the SRSB 450, as shown in FIG. 5B, count_to_empty=6, stos points to the sixth entry position (entry 5), and salloc points to the seventh entry position (entry 6). FIG. 5B shows the insertion of one call into the SRSB shown in FIG. 5A, but the insertion causes the stos pointer and count_to_empty counter to change by three (3) due to the relative location of the stos and salloc pointers in FIG. 5A. After another call that inserts one (1) more entry in the SRSB 450, as shown in FIG. 5C, count_to_empty=7, stos points to the seventh entry position (entry 6), and salloc points to the eighth entry position (entry 7). The count_to_empty counter value saturates at a maximum value equal to the size of the SRSB, because there can never be more entries to get to empty than the total size of the SRSB.

Figure 6:
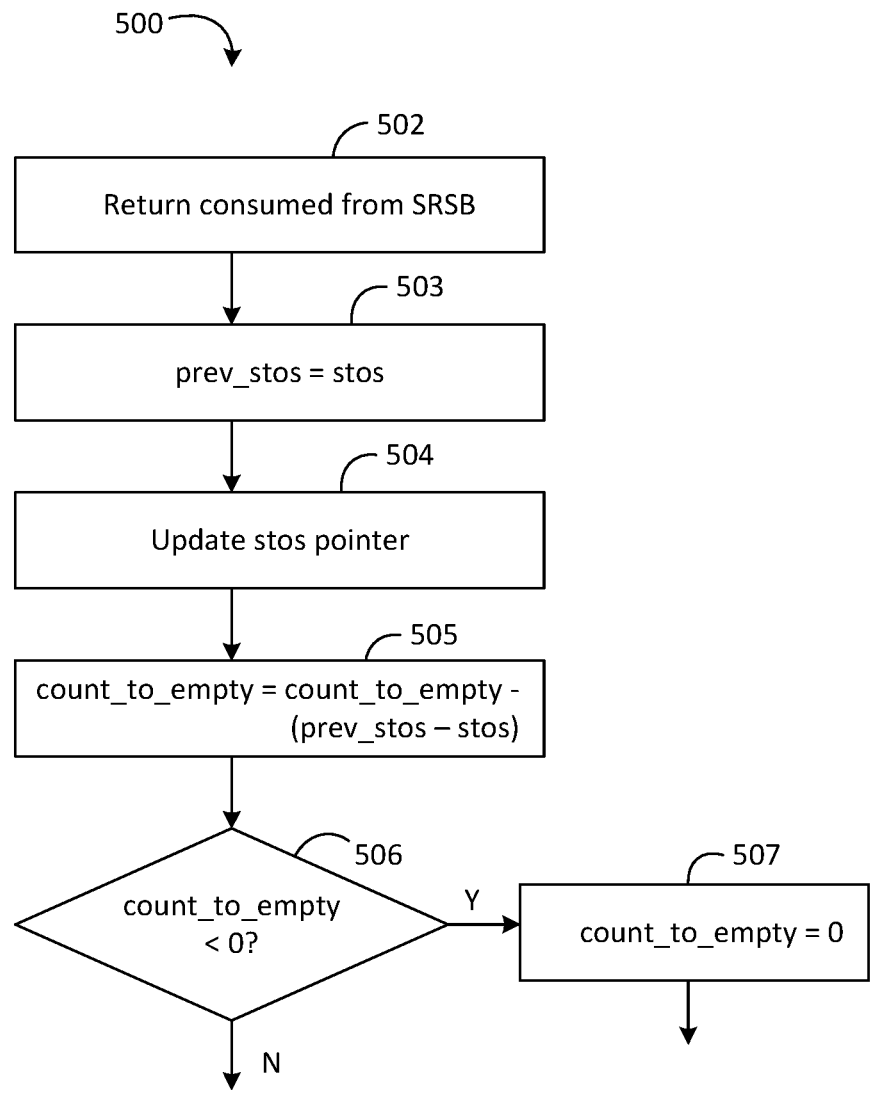
FIG. 6 is a flow diagram of another example of a method according to an embodiment.

When a return is consumed from the SRSB, the count_to_empty counter is decremented by the difference between the current stos pointer and the new stos pointer taken from the SRSB entry used. With reference to FIG. 6, an embodiment of a method 500 may start with a return consumed from the SRSB at box 502. The value of the current stos pointer is saved as "prev_stos" at box 503, before updating the stos pointer at box 504. The count_to_empty counter value is then decremented by the difference between the saved prev_stos and the current stos pointer at box 505. If the value of count_to_empty is less than zero at box 506, the value of the count_to_empty counter is set to zero at box 507.

Figure 7A:
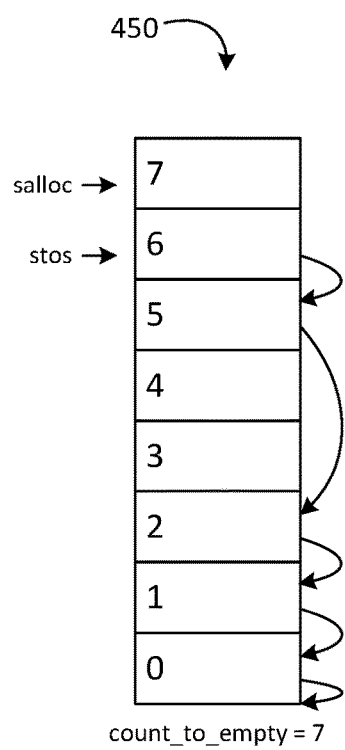
FIGS. 7A to 7C are illustrative diagrams of another example of a speculative return stack buffer according to an embodiment.
Figure 7B:
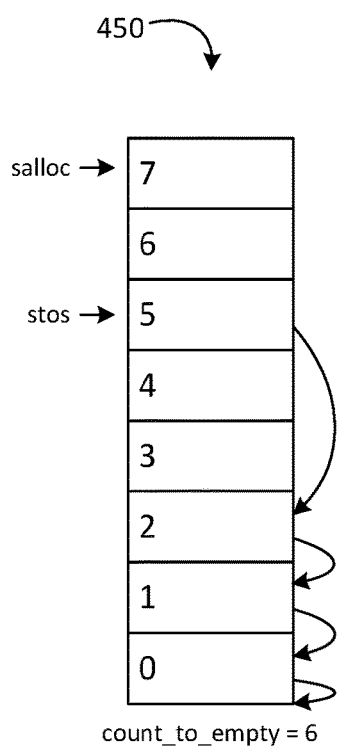
Figure 7C:
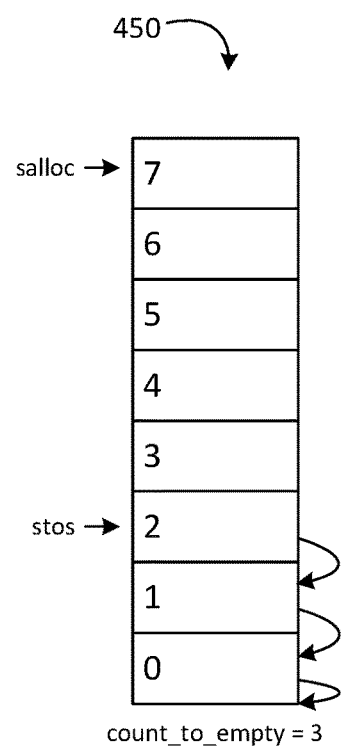

With reference to FIGS. 7A to 7C, in an initial state of the SRSB 450, as shown in FIG. 7A, count_to_empty=7, stos points to the seventh entry position (entry 6), and salloc points to the eighth entry position (entry 7). After one return that consumes one entry from the SRSB 450, as shown in FIG. 7B, count_to_empty=6, stos points to the sixth entry position (entry 5), and salloc points to the eighth entry position (entry 7). After another return that consumes three (3) entries from the SRSB 450, as shown in FIG. 7C, count_to_empty=3, stos points to the third entry position (entry 2), and salloc points to the eighth entry position (entry 7). When the count_to_empty counter value reaches zero (0), the SRSB is known to be overflowed and the SRSB's prediction should not be used. In accordance with some embodiments, the count_to_empty counter value does not go negative, and instead saturates at a minimum value of zero (0).

An embodiment of a SRSB may include additional handling for misprediction recovery. A current value of the count_to_empty counter may be stored in a taken branch information queue (TBIQ) along with all of the other misprediction recovery information. Another pointer referred to as "max_spec_salloc" (e.g., a maximum speculative SRSB allocation pointer) keeps track of a furthest SRSB entry written. When the value of the salloc pointer is equal to the value of the max_spec_salloc pointer, and a new call is written into the SRSB, both values are incremented. Unlike the salloc pointer, however, the max_spec_salloc pointer is not recovered on a misprediction and will keep its same value until the salloc pointer catches up to the max_spec_salloc. Accordingly, the max_spec_salloc pointer may track any SRSB entries that were overwritten since the time the count_to_empty counter value was written into the TBIQ.

Figures 8A, 8B:
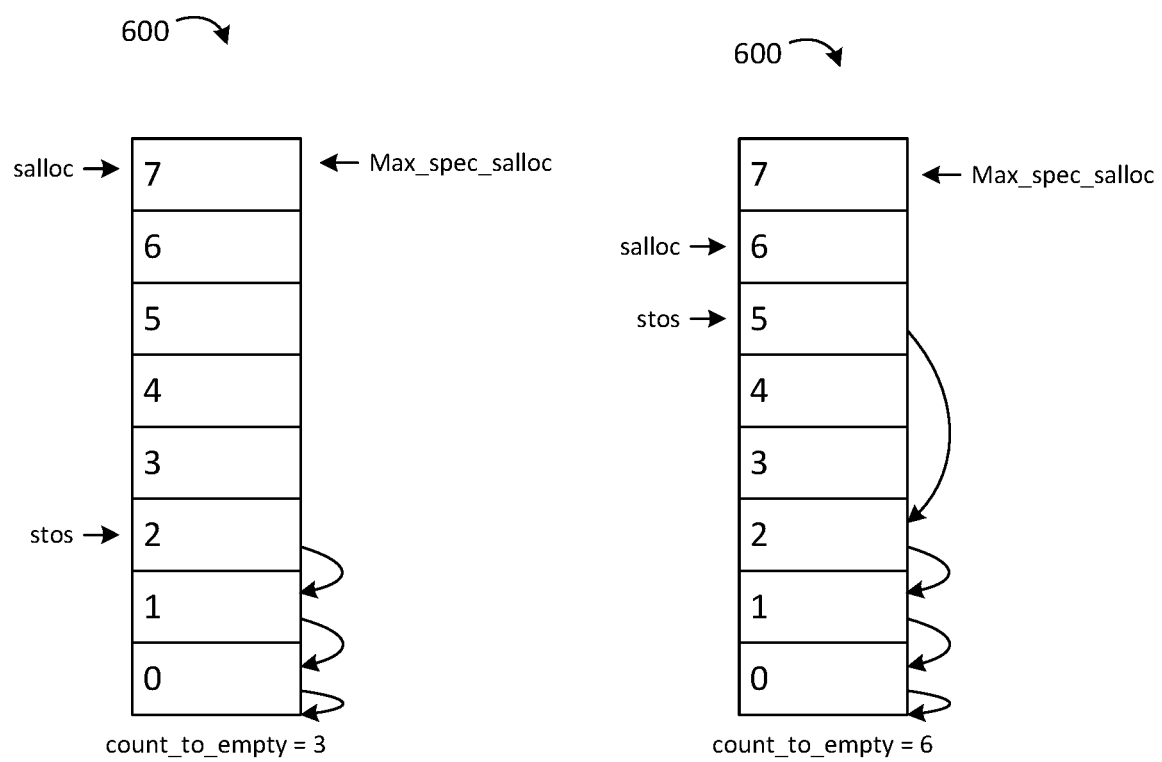
FIGS. 8A to 8B are illustrative diagrams of another example of a speculative return stack buffer according to an embodiment.

With reference to FIGS. 8A and 8B, in an initial state of a SRSB 600, as shown in FIG. 8A (e.g., similar to the last state shown in FIG. 7C), the max_spec_salloc pointer holds the value of the eighth position of the SRSB 600 (entry 7). When a branch misprediction recovers to the state of FIG. 8B, the value of the max_spec_alloc pointer remains unchanged. On a misprediction recovery, the count_to_empty value stored in the TBIQ is compared to the value of the size of the SRSB 600 minus the difference between the recovered salloc and the max_spec_salloc, and the lower of the two values is taken. In this way, some embodiments advantageously may detect and properly cause an overflow in any SRSB entries that were overwritten on the speculative path.

Although the SRSBs 450 and 600 show only eight entries, those skilled in the art will appreciate that embodiments are applicable to SRSBs with any useful number of entries (e.g., 128 entries or more in some practical applications). Some embodiments may allow overflow of the SRSB to be detected accurately with any combination of calls and returns, thereby improving the accuracy and security of return predictions. Some embodiments may track the state of the SRSB by counting the number of entries until the predictor is empty, and account for entries used on the speculative path. For example, some embodiments may be configured to work with the function of the processor pipeline and predictor structure, relying on the behavior of return predictors and branch speculation. Some embodiments may be particularly useful to prevent or inhibit side-channel attacks, where an attacker could cause speculative code execution to have measurable side effects resulting in the leaking of sensitive data. Some embodiments remove a potential side-channel vulnerability and will not predict to an address stored in an invalid SRSB entry. Instead, embodiments may predict to a default address (e.g., linear address zero (0) may be considered safe to use as the default prediction when the RSB is empty) when the RSB has been overflowed.

Some other hardware configurations may reduce some side-channel attack opportunities, but may have performance tradeoffs if they reduce the effectiveness of a hardware branch predictor and/or speculative execution. Some embodiments may prevent a side-channel attack where an address from a different mode of operation could be reused, but without having to invalidate or disable the return predictors, creating a security benefit without the performance tradeoff.

Figure 9:
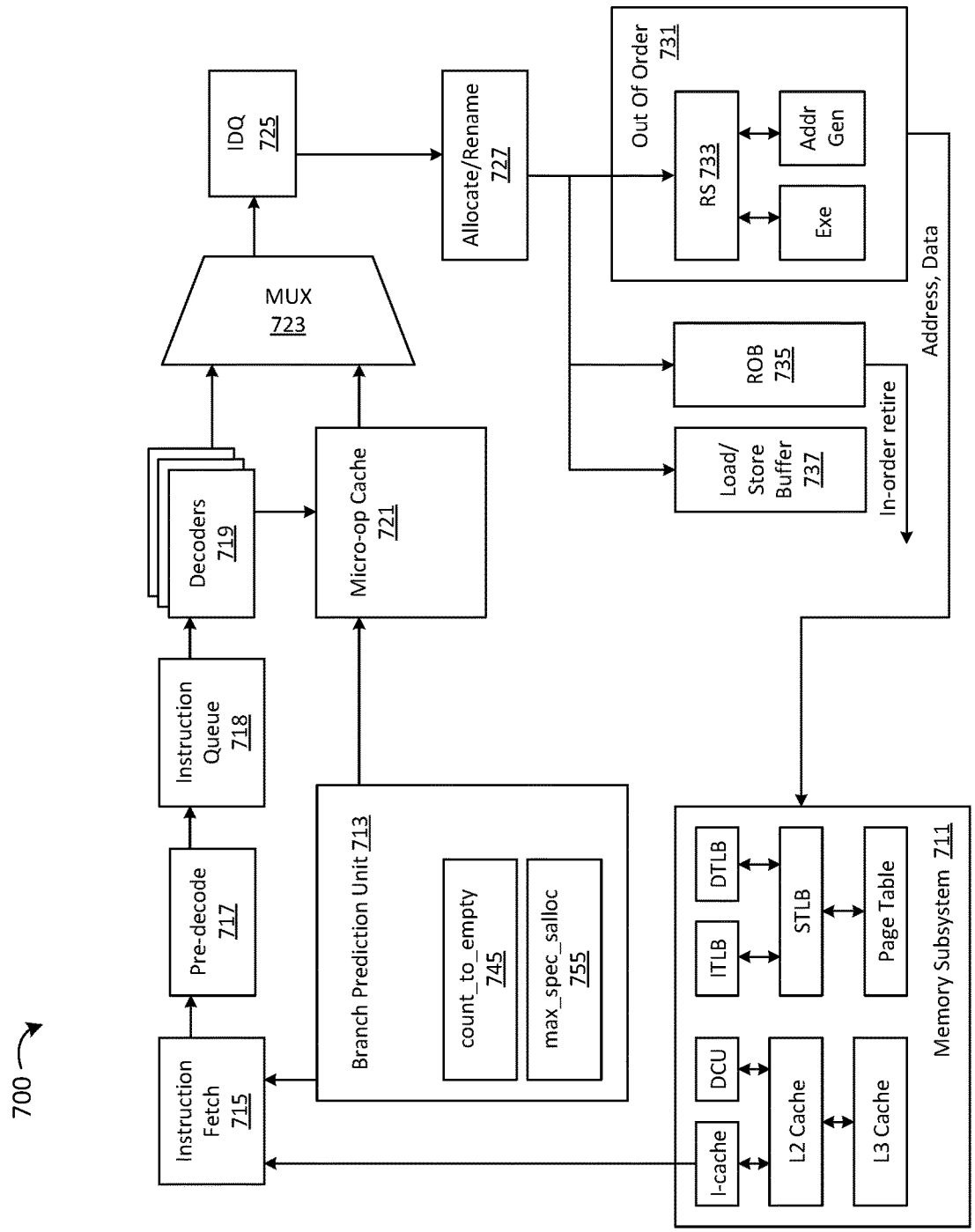
FIG. 9 is a block diagram of an example of an out-of-order processor according to an embodiment.

With reference to FIG. 9, an embodiment of an out-of-order (OOO) processor core 700 includes a memory subsystem 711, a branch prediction unit (BPU) 713, an instruction fetch circuit 715, a pre-decode circuit 717, an instruction queue 718, decoders 719, a micro-op cache 721, a mux 723, an instruction decode queue (IDQ) 725, an allocate/rename circuit 727, an out-of-order core 731, a reservation station (RS) 733, a re-order buffer (ROB) 735, and a load/store buffer 737, connected as shown. The memory subsystem 711 includes a level-1 (L1) instruction cache (I-cache), a L1 data cache (DCU), a L2 cache, a L3 cache, an instruction translation lookaside buffer (ITLB), a data translation lookaside buffer (DTLB), a shared translation lookaside buffer (STLB), and a page table, connected as shown. The OOO core 731 includes a reservation station (RS), an Exe circuit, and an address generation circuit, connected as shown. The BPU 713 further includes a count_to_empty counter 745, a max_spec_salloc pointer 755, and other circuitry as described herein, to improve microarchitectural return predictor security.

For example, the BPU 713 may include a RSB and a SRSB. At the time of prediction, the BPU 713 may be configured to live update the count_to_empty counter 745 to track a number of entries available in the SRSB (e.g., until the SRSB is empty), and return an output that corresponds to either the RSB or the SRSB, depending on the value of the count_to_empty counter 745. For example, the BPU 713 may be configured to return the output that corresponds to the RSB if the value of the count_to_empty counter 745 is zero. The BPU 713 may be configured to increment the value of the count_to_empty counter 745 by a difference between a salloc pointer value and a stos pointer value, in response to an insertion into the SRSB, and saturate an upper value of the count_to_empty counter 745 at the maximum size of the SRSB. The BPU 713 may be configured to decrement value of the count_to_empty counter 745 by a difference between the current stos pointer and a new stos pointer, in response to a consumption of a return prediction from the SRSB, and saturate a lower value of the count_to_empty counter 745 at zero (e.g., prevent negative values).

In some embodiments, the BPU 713 may be further configured to utilize the max_spec_salloc pointer 755 to track a furthest point written in the SRSB 329. When a new call is written into the SRSB, the BPU 713 may be configured to increment both the salloc pointer of the SRSB and the max_spec_salloc pointer 755, if the value of the salloc pointer is equal to the value of the max_spec_salloc pointer 755 (e.g., otherwise only the salloc pointer is incremented).

The BPU 713 may also be configured to update the value of the count_to_empty counter 745 based on the value of the max_spec_salloc pointer 755, in response to a misprediction recovery. For example, the BPU 713 may be configured to determine a number of overwritten entries in the SRSB based at least in part on the value of the max_spec_salloc pointer 755, and update the value of the count_to_empty counter 745 based on the number of overwritten entries, in response to the misprediction recovery.

The BPU 713 may also be configured to store a current value of the count_to_empty counter 745 in a TBIQ along with all of the other misprediction recovery information. On a misprediction recovery, the BPU 713 may be configured to compare the count_to_empty value stored in the TBIQ to the value of the size of the SRSB minus the difference between the recovered salloc and the max_spec_salloc, and take the lower of the two values.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 10B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11A:
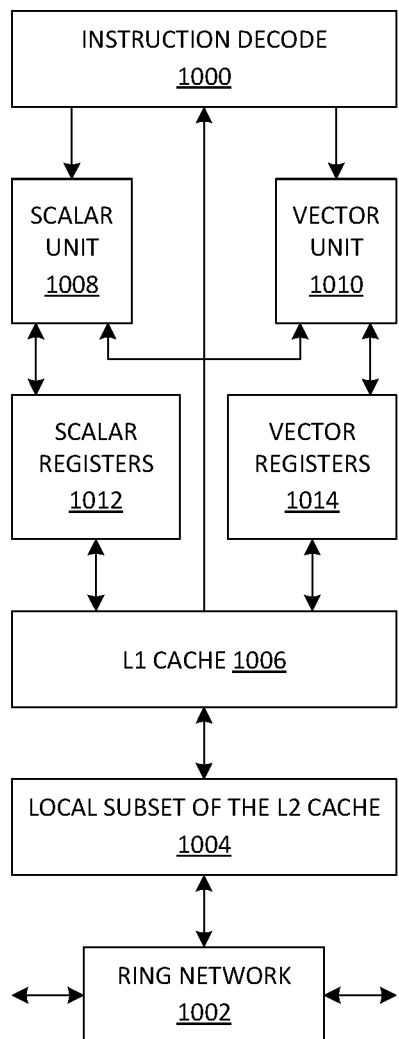
FIGS. 11A-B illustrate a block diagram of a more specific exemplary in-order core architecture, which core would be one of several logic blocks (including other cores of the same type and/or different types) in a chip.
Figure 11B:
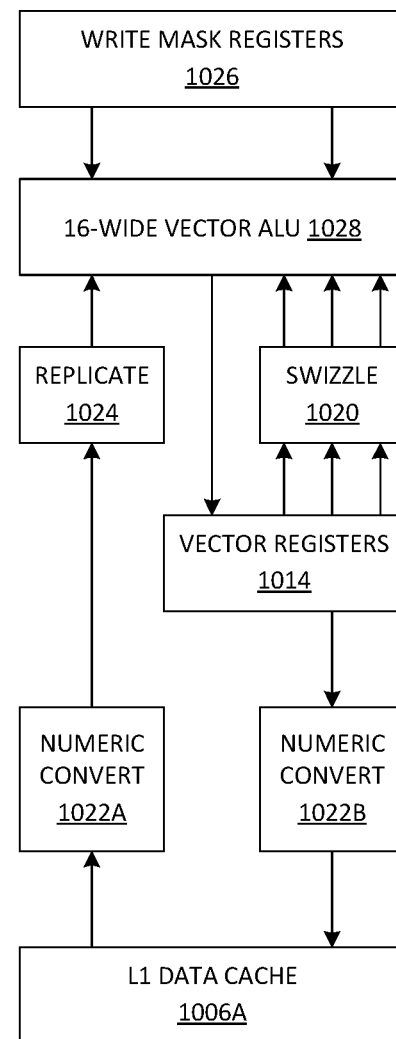

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 12:
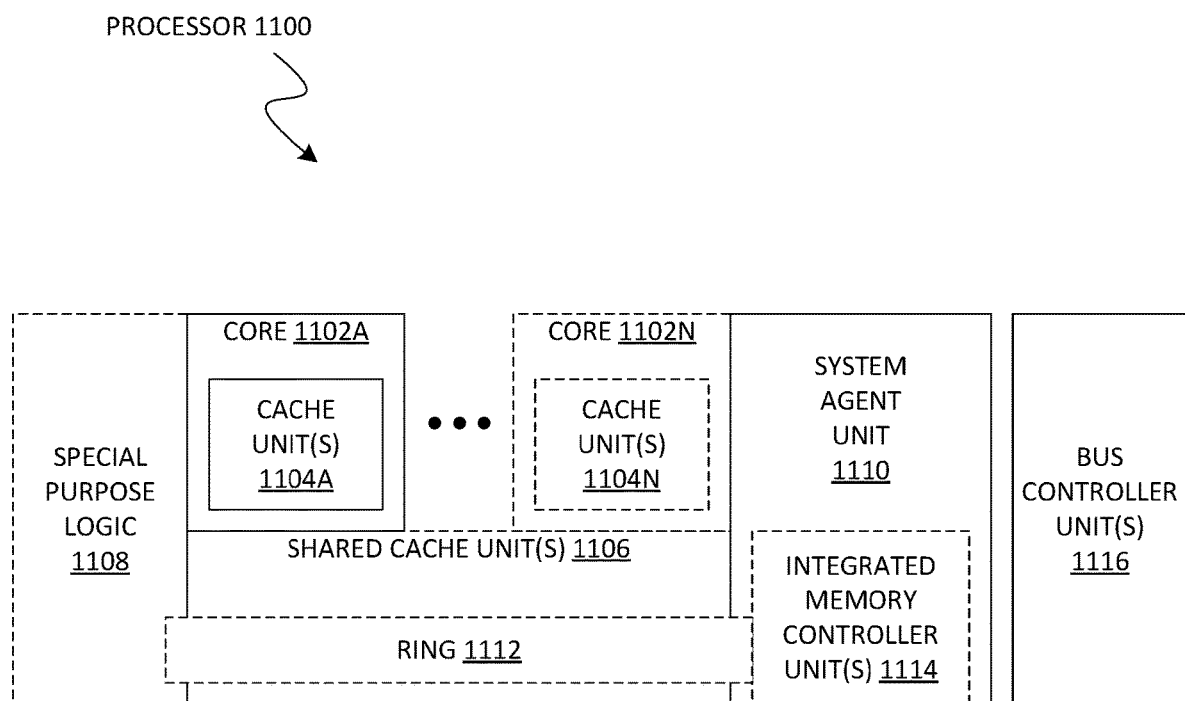
FIG. 12 is a block diagram of a processor that may have more than one core, may have an integrated memory controller, and may have integrated graphics according to embodiments of the invention.

FIG. 12 is a block diagram of a processor 1100 that may have more than one core, may have an integrated memory controller, and may have integrated graphics according to embodiments of the invention. The solid lined boxes in FIG. 12 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
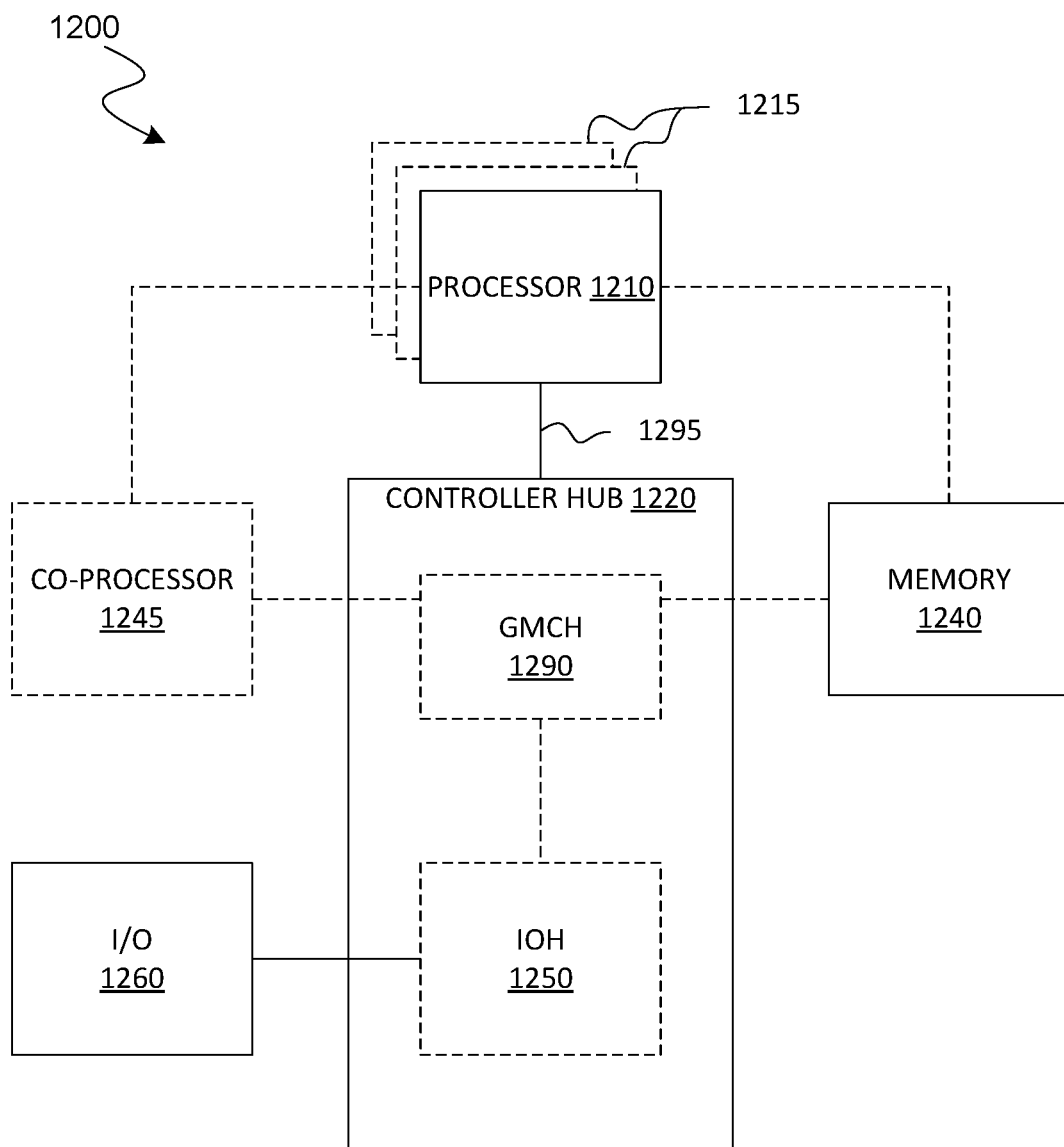
FIGS. 13-16 are block diagrams of exemplary computer architectures.

Referring now to FIG. 13, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 13 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 14:
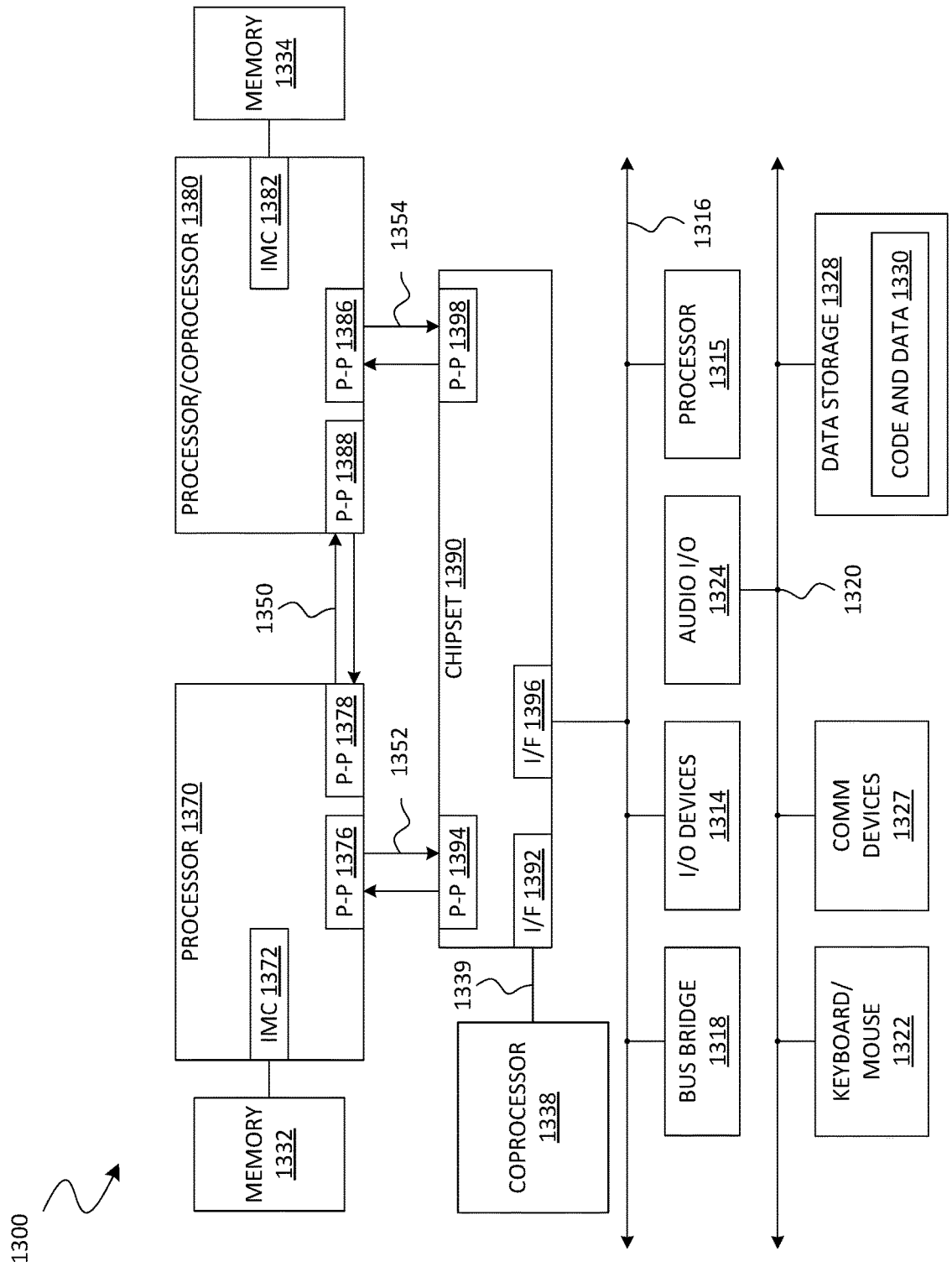

Referring now to FIG. 14, shown is a block diagram of a first more specific exemplary system 1300 in accordance with an embodiment of the present invention. As shown in FIG. 14, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 14, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 14, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 14, a system may implement a multi-drop bus or other such architecture.

Figure 15:
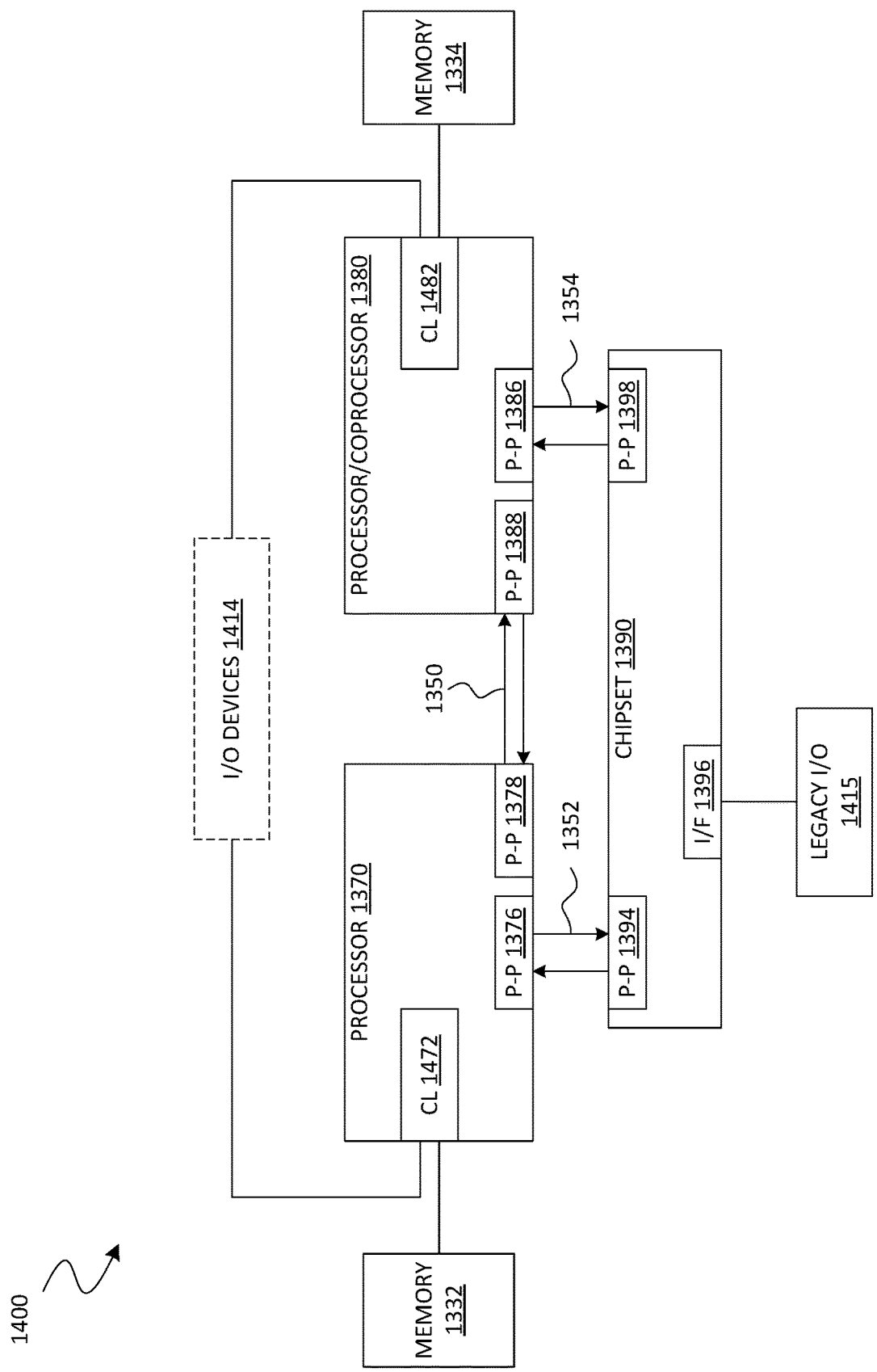

Referring now to FIG. 15, shown is a block diagram of a second more specific exemplary system 1400 in accordance with an embodiment of the present invention Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1370, 1380 may include integrated memory and I/O control logic ("CL") 1472 and 1482, respectively. Thus, the CL 1472, 1482 include integrated memory controller units and include I/O control logic. FIG. 15 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 16, shown is a block diagram of a SoC 1500 in accordance with an embodiment of the present invention. Similar elements in FIG. 12 bear like reference numerals. Also, dashed lined boxes are optional features on more advanced SoCs. In FIG. 16, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 17 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for ISA opcode parameterization are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Additional Notes and Examples

Example 1 includes an integrated circuit, comprising a return stack buffer (RSB), a speculative return stack buffer (SRSB), and circuitry coupled to the RSB and the SRSB, the circuitry to track a count until the SRSB is empty at a time of a prediction by a branch prediction unit, and return an output from the branch prediction unit that corresponds to one of the RSB and the SRSB based at least in part on the count until the SRSB is empty.

Example 2 includes the integrated circuit of Example 1, wherein the circuitry is further to return the output from the branch prediction unit that corresponds to the RSB if the count until the SRSB is empty is zero.

Example 3 includes the integrated circuit of any of Examples 1 to 2, wherein the circuitry is further to increment the count until the SRSB is empty by a difference between a first pointer value and a second pointer value, in response to an insertion into the SRSB, wherein the first pointer value corresponds to a top position of a stack for the SRSB and wherein the second pointer value corresponds to an allocated position for a next entry into the SRSB.

Example 4 includes the integrated circuit of Example 3, wherein the circuitry is further to limit the incremented count to an upper limit value of a maximum number of entries in the SRSB.

Example 5 includes the integrated circuit of any of Examples 1 to 4, wherein the circuitry is further to decrement the count until the SRSB is empty by a difference between a first pointer value and a second pointer value, in response to a consumption of a prediction from the SRSB, wherein the first pointer value corresponds to a current top position of a stack for the SRSB and the second pointer value corresponds to a new top position of the stack for the SRSB after the consumption of the prediction from the SRSB.

Example 6 includes the integrated circuit of Example 5, wherein the circuitry is further to limit the decremented count to a lower limit value of zero.

Example 7 includes the integrated circuit of any of Examples 1 to 6, wherein the circuitry is further to store a max pointer value to track a furthest point written in the SRSB.

Example 8 includes the integrated circuit of Example 7, wherein the circuitry is further to update the count until the SRSB is empty based on the max pointer value, in response to a misprediction recovery.

Example 9 includes the integrated circuit of Example 8, wherein the circuitry is further to determine a number of overwritten entries in the SRSB based at least in part on the max pointer value, and update the count until the SRSB is empty based on the number of overwritten entries, in response to the misprediction recovery.

Example 10 includes a method, comprising tracking a count until a speculative return stack buffer (SRSB) is empty at a time of a prediction by a branch prediction unit, and returning an output from the branch prediction unit that corresponds to one of a return stack buffer (RSB) and the SRSB based at least in part on the count until the SRSB is empty.

Example 11 includes the method of Example 10, further comprising returning the output from the branch prediction unit that corresponds to the RSB if the count until the SRSB is empty is zero.

Example 12 includes the method of any of Examples 10 to 11, further comprising incrementing the count until the SRSB is empty by a difference between a first pointer value and a second pointer value, in response to an insertion into the SRSB, wherein the first pointer value corresponds to a top position of a stack for the SRSB and wherein the second pointer value corresponds to an allocated position for a next entry into the SRSB.

Example 13 includes the method of Example 12, further comprising limiting the incremented count to an upper limit value of a maximum number of entries in the SRSB.

Example 14 includes the method of any of Examples 10 to 13, further comprising decrementing the count until the SRSB is empty by a difference between a first pointer value and a second pointer value, in response to a consumption of a prediction from the SRSB, wherein the first pointer value corresponds to a current top position of a stack for the SRSB and the second pointer value corresponds to a new top position of the stack for the SRSB after the consumption of the prediction from the SRSB.

Example 15 includes the method of Example 14, further comprising limiting the decremented count to a lower limit value of zero.

Example 16 includes the method of any of Examples 10 to 15, further comprising storing a max pointer value to track a furthest point written in the SRSB.

Example 17 includes the method of Example 16, further comprising updating the count until the SRSB is empty based on the max pointer value, in response to a misprediction recovery.

Example 18 includes the method of Example 17, further comprising determining a number of overwritten entries in the SRSB based at least in part on the max pointer value, and updating the count until the SRSB is empty based on the number of overwritten entries, in response to the misprediction recovery.

Example 19 includes an apparatus, comprising a back end unit to execute one or more decoded instructions, and a front end unit communicatively coupled to the back end unit to decode one or more instructions, the front end unit including a branch prediction unit, wherein the branch prediction unit comprises a return stack buffer (RSB), a speculative return stack buffer (SRSB), and circuitry coupled to the RSB and the SRSB, the circuitry to track a count until the SRSB is empty at a time of a prediction by a branch prediction unit, and return an output from the branch prediction unit that corresponds to one of the RSB and the SRSB based at least in part on the count until the SRSB is empty.

Example 20 includes the apparatus of Example 19, wherein the circuitry is further to return the output from the branch prediction unit that corresponds to the RSB if the count until the SRSB is empty is zero.

Example 21 includes the apparatus of any of Examples 19 to 20, wherein the circuitry is further to increment the count until the SRSB is empty by a difference between a first pointer value and a second pointer value, in response to an insertion into the SRSB, wherein the first pointer value corresponds to a top position of a stack for the SRSB and wherein the second pointer value corresponds to an allocated position for a next entry into the SRSB.

Example 22 includes the apparatus of Example 21, wherein the circuitry is further to limit the incremented count to an upper limit value of a maximum number of entries in the SRSB.

Example 23 includes the apparatus of any of Examples 19 to 22, wherein the circuitry is further to decrement the count until the SRSB is empty by a difference between a first pointer value and a second pointer value, in response to a consumption of a prediction from the SRSB, wherein the first pointer value corresponds to a current top position of a stack for the SRSB and the second pointer value corresponds to a new top position of the stack for the SRSB after the consumption of the prediction from the SRSB.

Example 24 includes the apparatus of Example 23, wherein the circuitry is further to limit the decremented count to a lower limit value of zero.

Example 25 includes the apparatus of any of Examples 19 to 24, wherein the circuitry is further to store a max pointer value to track a furthest point written in the SRSB.

Example 26 includes the apparatus of Example 25, wherein the circuitry is further to update the count until the SRSB is empty based on the max pointer value, in response to a misprediction recovery.

Example 27 includes the apparatus of Example 26, wherein the circuitry is further to determine a number of overwritten entries in the SRSB based at least in part on the max pointer value, and update the count until the SRSB is empty based on the number of overwritten entries, in response to the misprediction recovery.

Example 28 includes an apparatus, comprising means for tracking a count until a speculative return stack buffer (SRSB) is empty at a time of a prediction by a branch prediction unit, and means for returning an output from the branch prediction unit that corresponds to one of a return stack buffer (RSB) and the SRSB based at least in part on the count until the SRSB is empty.

Example 29 includes the apparatus of Example 28, further comprising means for returning the output from the branch prediction unit that corresponds to the RSB if the count until the SRSB is empty is zero.

Example 30 includes the apparatus of any of Examples 28 to 29, further comprising means for incrementing the count until the SRSB is empty by a difference between a first pointer value and a second pointer value, in response to an insertion into the SRSB, wherein the first pointer value corresponds to a top position of a stack for the SRSB and wherein the second pointer value corresponds to an allocated position for a next entry into the SRSB.

Example 31 includes the apparatus of Example 30, further comprising means for limiting the incremented count to an upper limit value of a maximum number of entries in the SRSB.

Example 32 includes the apparatus of any of Examples 28 to 31, further comprising means for decrementing the count until the SRSB is empty by a difference between a first pointer value and a second pointer value, in response to a consumption of a prediction from the SRSB, wherein the first pointer value corresponds to a current top position of a stack for the SRSB and the second pointer value corresponds to a new top position of the stack for the SRSB after the consumption of the prediction from the SRSB.

Example 33 includes the apparatus of Example 32, further comprising means for limiting the decremented count to a lower limit value of zero.

Example 34 includes the apparatus of any of Examples 28 to 33, further comprising means for storing a max pointer value to track a furthest point written in the SRSB.

Example 35 includes the apparatus of Example 34, further comprising means for updating the count until the SRSB is empty based on the max pointer value, in response to a misprediction recovery.

Example 36 includes the apparatus of Example 35, further comprising means for determining a number of overwritten entries in the SRSB based at least in part on the max pointer value, and means for updating the count until the SRSB is empty based on the number of overwritten entries, in response to the misprediction recovery.

Example 37 includes at least one non-transitory machine readable medium comprising a plurality of instructions that, in response to being executed on a computing device, cause the computing device to track a count until a speculative return stack buffer (SRSB) is empty at a time of a prediction by a branch prediction unit, and return an output from the branch prediction unit that corresponds to one of a return stack buffer (RSB) and the SRSB based at least in part on the count until the SRSB is empty.

Example 38 includes the at least one non-transitory machine readable medium of Example 37, comprising a plurality of further instructions that, in response to being executed on the computing device, cause the computing device to return the output from the branch prediction unit that corresponds to the RSB if the count until the SRSB is empty is zero.

Example 39 includes the at least one non-transitory machine readable medium of any of Examples 37 to 38, comprising a plurality of further instructions that, in response to being executed on the computing device, cause the computing device to increment the count until the SRSB is empty by a difference between a first pointer value and a second pointer value, in response to an insertion into the SRSB, wherein the first pointer value corresponds to a top position of a stack for the SRSB and wherein the second pointer value corresponds to an allocated position for a next entry into the SRSB.

Example 40 includes the at least one non-transitory machine readable medium of Example 39, comprising a plurality of further instructions that, in response to being executed on the computing device, cause the computing device to limit the incremented count to an upper limit value of a maximum number of entries in the SRSB.

Example 41 includes the at least one non-transitory machine readable medium of any of Examples 37 to 40, comprising a plurality of further instructions that, in response to being executed on the computing device, cause the computing device to decrement the count until the SRSB is empty by a difference between a first pointer value and a second pointer value, in response to a consumption of a prediction from the SRSB, wherein the first pointer value corresponds to a current top position of a stack for the SRSB and the second pointer value corresponds to a new top position of the stack for the SRSB after the consumption of the prediction from the SRSB.

Example 42 includes the at least one non-transitory machine readable medium of Example 41, comprising a plurality of further instructions that, in response to being executed on the computing device, cause the computing device to limit the decremented count to a lower limit value of zero.

Example 43 includes the at least one non-transitory machine readable medium of any of Examples 37 to 42, comprising a plurality of further instructions that, in response to being executed on the computing device, cause the computing device to store a max pointer value to track a furthest point written in the SRSB.

Example 44 includes the at least one non-transitory machine readable medium of Example 43, comprising a plurality of further instructions that, in response to being executed on the computing device, cause the computing device to update the count until the SRSB is empty based on the max pointer value, in response to a misprediction recovery.

Example 45 includes the at least one non-transitory machine readable medium of Example 44, comprising a plurality of further instructions that, in response to being executed on the computing device, cause the computing device to determine a number of overwritten entries in the SRSB based at least in part on the max pointer value, and update the count until the SRSB is empty based on the number of overwritten entries, in response to the misprediction recovery.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
a return stack buffer (RSB);
a speculative return stack buffer (SRSB); and
circuitry coupled to the RSB and the SRSB, the circuitry to:
maintain a count which indicates a number of entries until the SRSB is empty, wherein:
based on a first indication of an insertion into the SRSB, the circuitry is to increment the count by a first difference between:
a first pointer which corresponds to a top position of a stack for the SRSB; and
a second pointer which corresponds to an allocated position for a next entry into the SRSB; and
based on a second indication of a consumption of a return from the SRSB, the circuitry is to:
identify a change of the first pointer from a first value which corresponds to a current top position of the stack, to a second value which corresponds to a next top position of the stack; and
decrement the count by an amount which is equal to a second difference between the first value and the second value; and
determine a third value of the count at a time of a prediction by a branch prediction unit;
wherein:
where the third value indicates that the number of entries is equal to zero, the circuitry is to select a first branch prediction output that corresponds to the RSB; and
where the third value indicates that the number of entries is greater than zero, the circuitry is to select a second branch prediction output that corresponds to the SRSB.

2. The integrated circuit of claim 1, wherein the circuitry is further to:
limit the count to an upper limit value of a maximum number of entries in the SRSB.

3. The integrated circuit of claim 1, wherein the circuitry is further to:
limit the count to a lower limit value of zero.

4. The integrated circuit of claim 1, wherein the circuitry is further to:
store a max pointer value to track a furthest point written in the SRSB.

5. The integrated circuit of claim 4, wherein the circuitry is further to:
update the count based on the max pointer value, in response to a misprediction recovery.

6. The integrated circuit of claim 5, wherein the circuitry is further to:
determine a number of overwritten entries in the SRSB based at least in part on the max pointer value; and
update the count based on the number of overwritten entries, in response to the misprediction recovery.

7. A method, comprising:
maintaining a count which indicates a number of entries until a speculative return stack buffer (SRSB) is empty, the maintaining comprising:
based on a first indication of an insertion into the SRSB, incrementing the count by a first difference between:
a first pointer which corresponds to a top position of a stack for the SRSB; and
a second pointer which corresponds to an allocated position for a next entry into the SRSB; and
based on a second indication of a consumption of a return from the SRSB:
identifying a change of the first pointer from a first value which corresponds to a current top position of the stack, to a second value which corresponds to a next top position of the stack; and
decrementing the count by an amount which is equal to a second difference between the first value and the second value;
determining a third value of the count at a time of a prediction by a branch prediction unit;
where the third value indicates that the number of entries is equal to zero, selecting a first branch prediction output that corresponds to a return stack buffer (RSB); and
where the third value indicates that the number of entries is greater than zero, selecting a second branch prediction output that corresponds to the SRSB.

8. The method of claim 7, further comprising:
limiting the count to an upper limit value of a maximum number of entries in the SRSB.

9. The method of claim 7, further comprising:
limiting the count to a lower limit value of zero.

10. The method of claim 7, further comprising:
storing a max pointer value to track a furthest point written in the SRSB.

11. The method of claim 10, further comprising:
updating the count based on the max pointer value, in response to a misprediction recovery.

12. The method of claim 11, further comprising:
determining a number of overwritten entries in the SRSB based at least in part on the max pointer value; and
updating the count based on the number of overwritten entries, in response to the misprediction recovery.

13. An apparatus, comprising:
a back end unit to execute one or more decoded instructions; and
a front end unit communicatively coupled to the back end unit to decode one or more instructions, the front end unit including a branch prediction unit, wherein the branch prediction unit comprises a return stack buffer (RSB), a speculative return stack buffer (SRSB), and circuitry coupled to the RSB and the SRSB, the circuitry to:

maintain a count which indicates a number of entries until the SRSB is empty, wherein:
- based on a first indication of an insertion into the SRSB, the circuitry is to increment the count by a first difference between:
  - a first pointer which corresponds to a top position of a stack for the SRSB; and
  - a second pointer which corresponds to an allocated position for a next entry into the SRSB; and
- based on a second indication of a consumption of a return from the SRSB, the circuitry is to:
  - identify a change of the first pointer from a first value which corresponds to a current top position of the stack, to a second value which corresponds to a next top position of the stack; and
  - decrement the count by an amount which is equal to a second difference between the first value and the second value; and determine a third value of the count at a time of a prediction by the branch prediction unit;

wherein:
- where the third value indicates that the number of entries is equal to zero, the circuitry is to select a first branch prediction output that corresponds to the RSB; and
- where the third value indicates that the number of entries is greater than zero, the circuitry is to select a second branch prediction output that corresponds to the SRSB.

14. The apparatus of claim 13, wherein the circuitry is further to:
limit the count to an upper limit value of a maximum number of entries in the SRSB.

15. The apparatus of claim 13, wherein the circuitry is further to:
limit the count to a lower limit value of zero.

16. The apparatus of claim 13, wherein the circuitry is further to:
store a max pointer value to track a furthest point written in the SRSB.

17. The apparatus of claim 16, wherein the circuitry is further to:
update the count based on the max pointer value, in response to a misprediction recovery.

18. The apparatus of claim 17, wherein the circuitry is further to:
determine a number of overwritten entries in the SRSB based at least in part on the max pointer value; and
update the count based on the number of overwritten entries, in response to the misprediction recovery.

* * * * *